(12) United States Patent
Hidaka et al.

(10) Patent No.: US 12,316,195 B2
(45) Date of Patent: May 27, 2025

(54) GEARED MOTOR DRIVE CONTROL MECHANISM

(71) Applicant: TSUKASA ELECTRIC CO., LTD., Tokyo (JP)

(72) Inventors: Akio Hidaka, Miyakonojo (JP); Hiroyuki Takahashi, Tokyo (JP); Keigo Urashima, Miyakonojo (JP)

(73) Assignee: Tsukasa Electric Co., Ltd.

( * ) Notice: Subject to any disclaimer, the term of this patent is extended or adjusted under 35 U.S.C. 154(b) by 233 days.

(21) Appl. No.: 17/778,305

(22) PCT Filed: Nov. 20, 2020

(86) PCT No.: PCT/JP2020/043501
§ 371 (c)(1),
(2) Date: May 19, 2022

(87) PCT Pub. No.: WO2021/100871
PCT Pub. Date: May 27, 2021

(65) Prior Publication Data
US 2023/0006509 A1  Jan. 5, 2023

(30) Foreign Application Priority Data
Nov. 22, 2019 (JP) .................. 2019-211173

(51) Int. Cl.
*H02K 7/116* (2006.01)
*H02K 7/10* (2006.01)
*H02K 7/102* (2006.01)

(52) U.S. Cl.
CPC ............. *H02K 7/116* (2013.01); *H02K 7/10* (2013.01); *H02K 7/1023* (2013.01)

(58) Field of Classification Search
CPC ........ H02K 7/116; H02K 7/10; H02K 7/1023; H02K 11/215; H02K 7/106;
(Continued)

(56) References Cited

U.S. PATENT DOCUMENTS

| | | |
|---|---|---|
| 5,751,127 A | 5/1998 | Austin et al. |
| 6,794,778 B1 | 9/2004 | Walker et al. |

(Continued)

FOREIGN PATENT DOCUMENTS

| | | | |
|---|---|---|---|
| EP | 3396817 A1 * | 10/2018 | ............. H02K 7/106 |
| EP | 3706292 A1 | 9/2020 | |

(Continued)

OTHER PUBLICATIONS

FR2851092A1 English translation (Year: 2024).*
(Continued)

*Primary Examiner* — Christopher M Koehler
*Assistant Examiner* — Viswanathan Subramanian
(74) *Attorney, Agent, or Firm* — Best Mode IP Law, PLLC; Yusuke Hirai

(57) ABSTRACT

Provided is a drive control mechanism of a geared motor capable of executing a stopping operation between a start point and an end point in a drive range, maintaining this stopping operation, and smoothly and reliably executing respective operations that start from this stopped state without applying any external force other than a drive input of the electric motor. The drive control mechanism of a geared motor 1 according to the present invention includes the geared motor 1 formed by integrating an electric motor 2 with a speed change unit 3 including an input shaft that is a drive shaft 21 of the electric motor 2, and braking means 4, 14 for controlling braking in each of driven and stopped states in an output shaft 32 of the speed change unit 3, and the braking means 4, 14 includes a rotating part 40, 140 rotatably and pivotally supported by the drive shaft 21 of the electric motor 2, and including a permanent magnet 43, 143 disposed in an annular shape, and a fixing part 41, 141 fixed to a case 20 of the electric motor 2, and including a permanent magnet 45, 146 disposed facing the permanent (Continued)

magnet 43, 143 of the rotating part 40, 140 with a different polarity in the stopped state, and disposed in an annular shape.

11 Claims, 11 Drawing Sheets

(58) Field of Classification Search
CPC ...... H02K 2207/03; H02K 49/10; E06B 9/72; E06B 2009/6809; E06B 9/68; E06B 9/88; E06B 9/84; F16D 63/002
See application file for complete search history.

(56) References Cited

U.S. PATENT DOCUMENTS

| | | |
|---|---|---|
| 2018/0219452 A1 | 8/2018 | Boisclair et al. |
| 2022/0278598 A1 | 9/2022 | Ohba et al. |

FOREIGN PATENT DOCUMENTS

| | | | |
|---|---|---|---|
| ES | 2316274 | 4/2009 | |
| FR | 2851092 A1 * | 8/2004 | ............. H02K 53/00 |
| FR | 2884269 | 10/2006 | |
| FR | 2929771 | 10/2009 | |
| FR | 3035279 A1 | 10/2016 | |
| JP | 61-153467 | 7/1986 | |
| JP | 61-154475 | 7/1986 | |
| JP | 07-194092 | 7/1995 | |
| JP | 09-74777 | 3/1997 | |
| JP | 10-243628 | 9/1998 | |
| JP | 2003-004074 | 1/2003 | |
| JP | A 1995111772 | 2/2004 | |
| JP | 2004-129478 | 4/2004 | |
| JP | 2005-317845 | 11/2005 | |
| JP | 2005-323419 | 11/2005 | |
| JP | 2005-342356 | 12/2005 | |
| JP | A 2004048963 | 10/2006 | |
| JP | 2007-77719 | 3/2007 | |
| JP | U11992061460 | 7/2008 | |
| JP | 2010-24752 | 2/2010 | |
| JP | 2010-189913 | 9/2010 | |
| JP | 2011-144854 | 7/2011 | |
| JP | 2013-500413 | 1/2013 | |
| WO | WO 2008/085931 A2 | 7/2008 | |

OTHER PUBLICATIONS

FR2884269A1 English translation (Year: 2024).*
JP07194092A English translation (Year: 2024).*
EP3396817A1 English translation (Year: 2024).*
Extended European Search Report in 20891061.2-1202 / 4064535 PCT/JP2020043501, dated Oct. 27, 2023.
International Search Report and Written Opinion in PCT/JP2020/043501, dated Jan. 19, 2021.
Third Party Observation for application No. EP20200891061, dated Nov. 13, 2024.

* cited by examiner

[FIG.1]
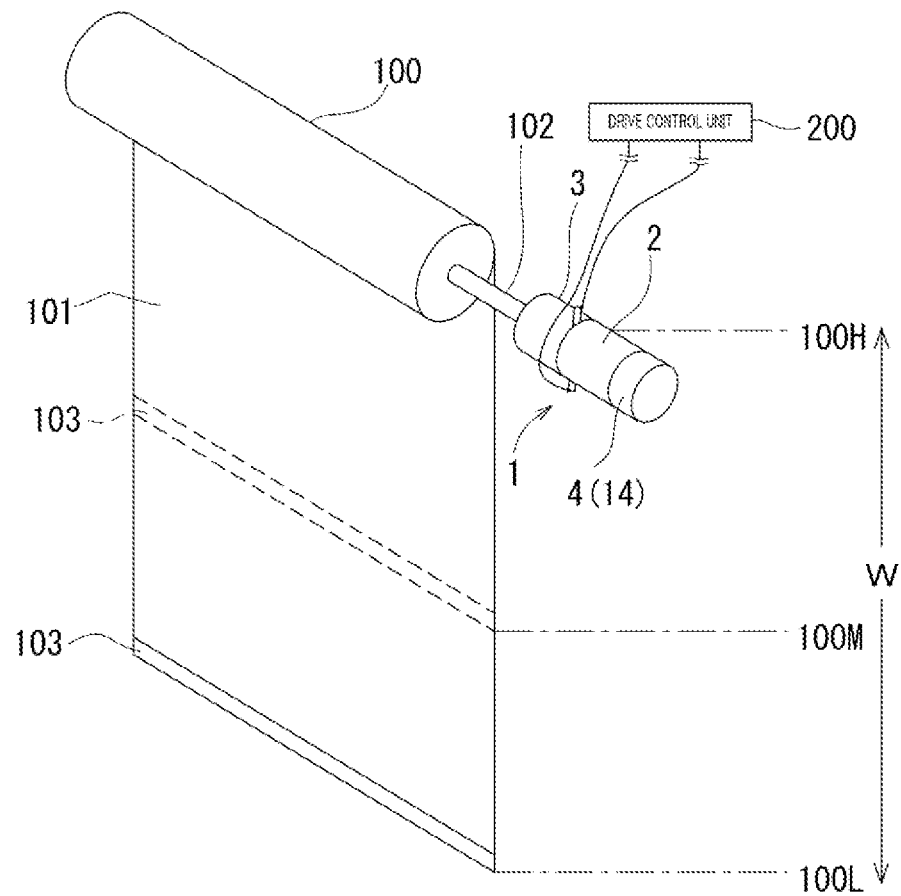
[FIG.2]
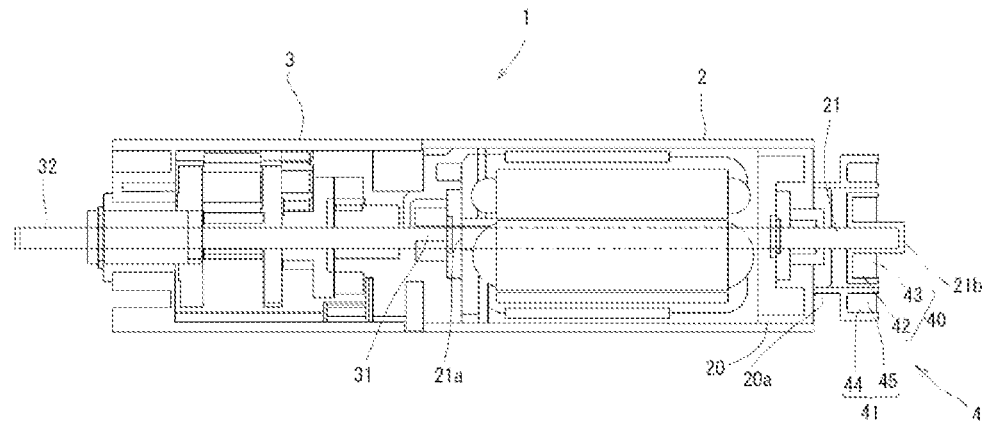

[FIG.3]
(A)
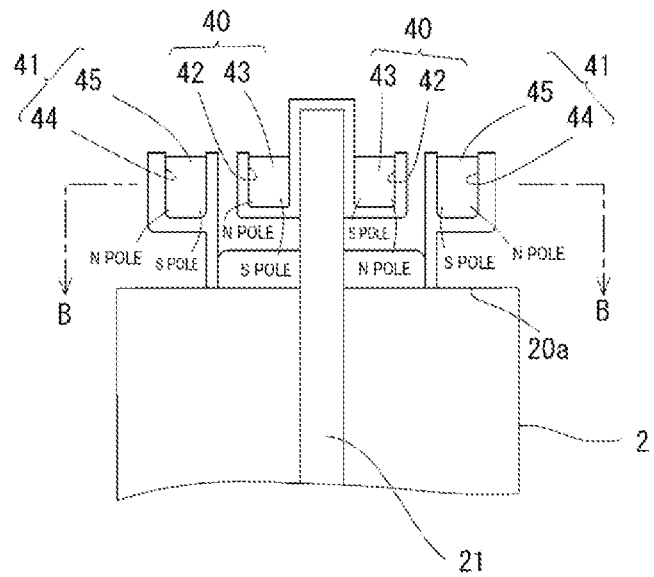
(B)
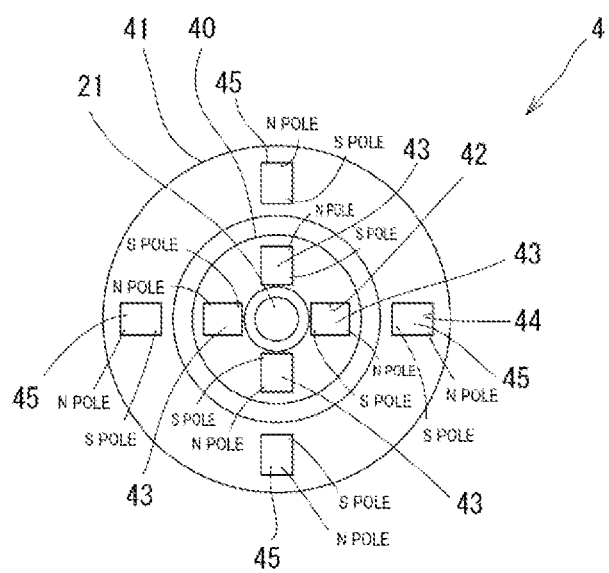

[FIG.4]
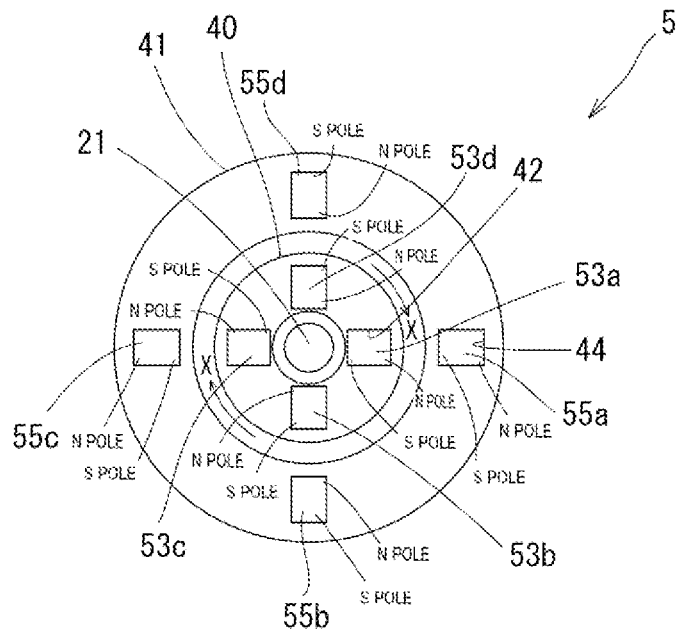
[FIG.5]
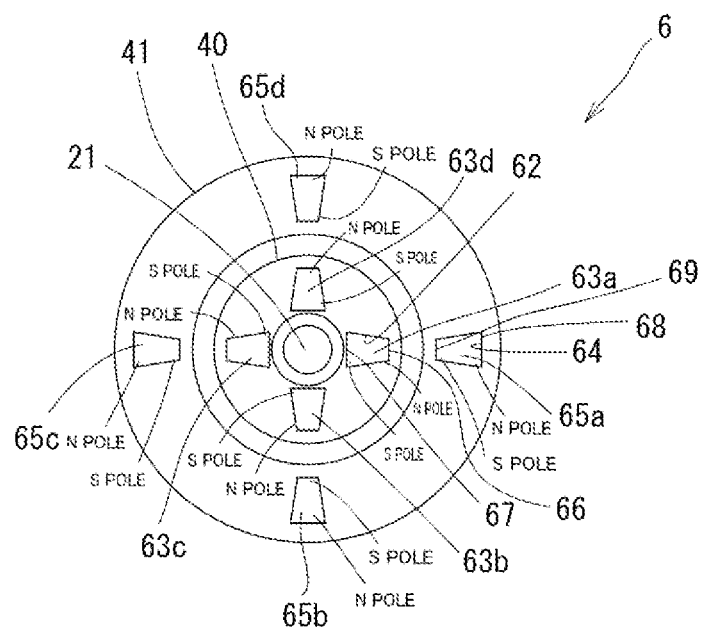

[FIG.6]
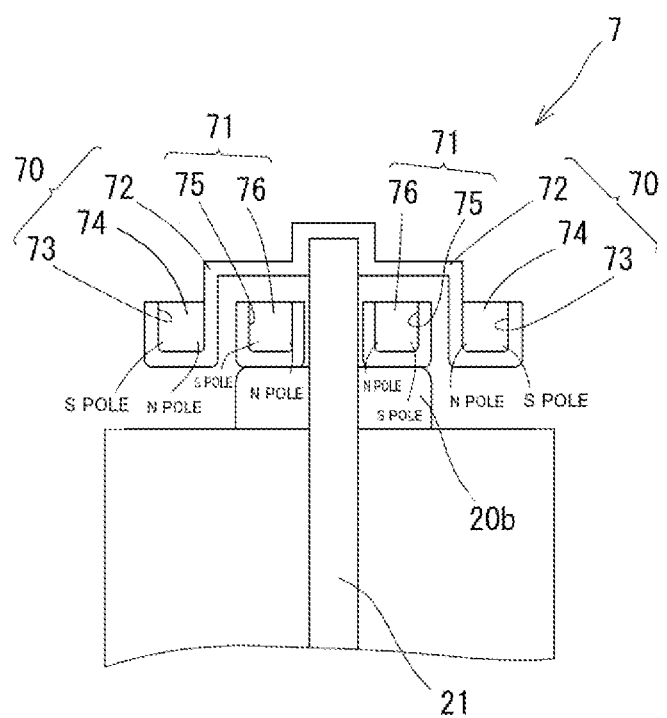

[FIG.7]
(A)
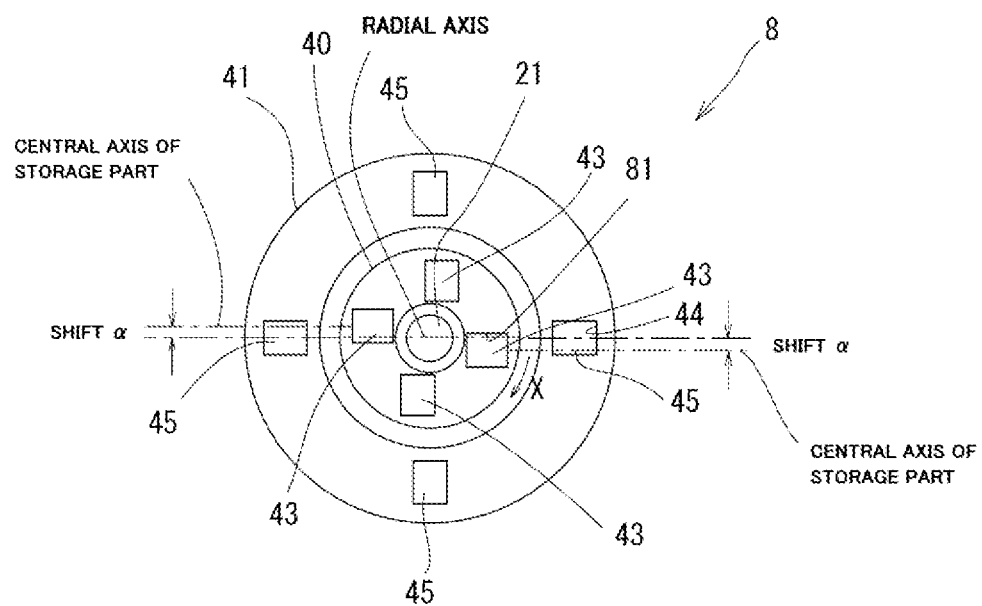
(B)
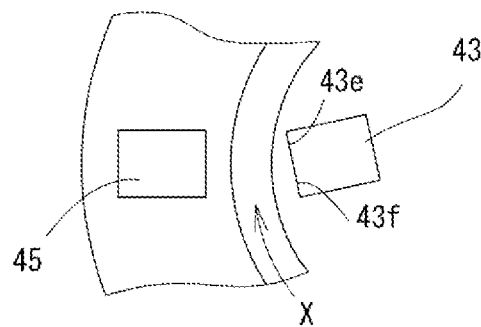

[FIG.8]
(A)
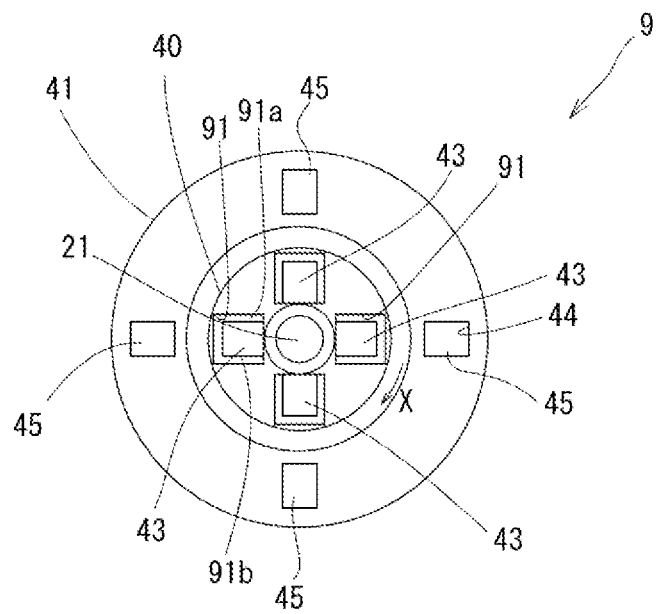
(B)
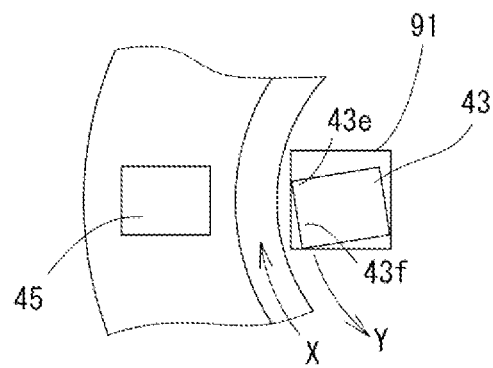

[FIG.9]
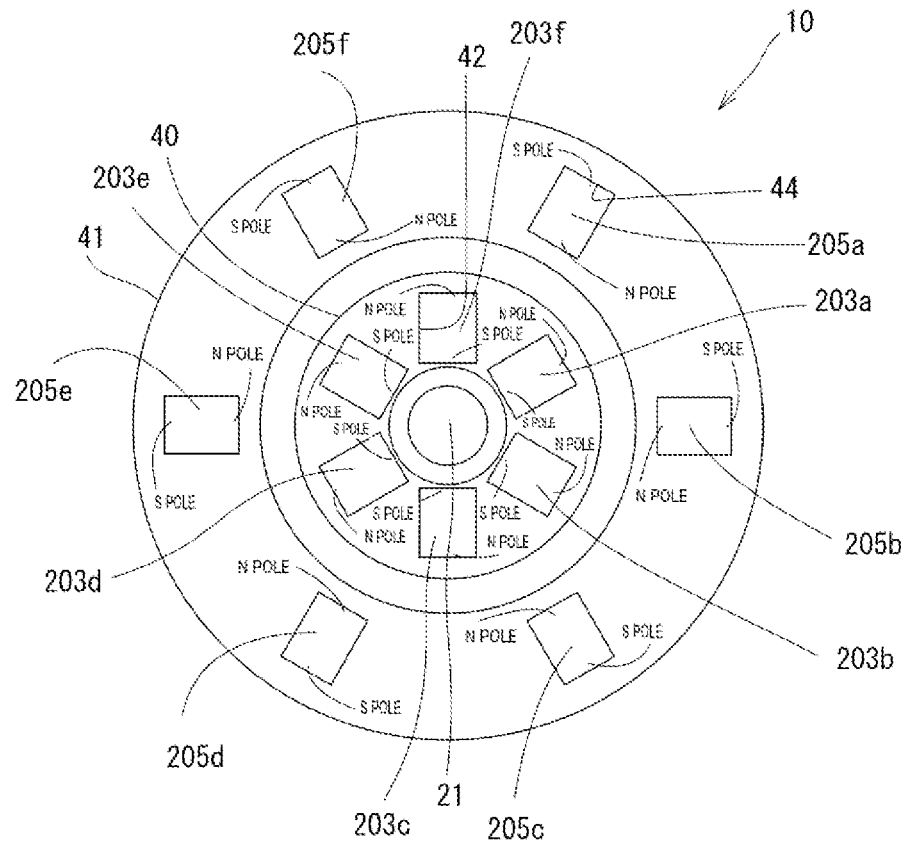
[FIG.10]
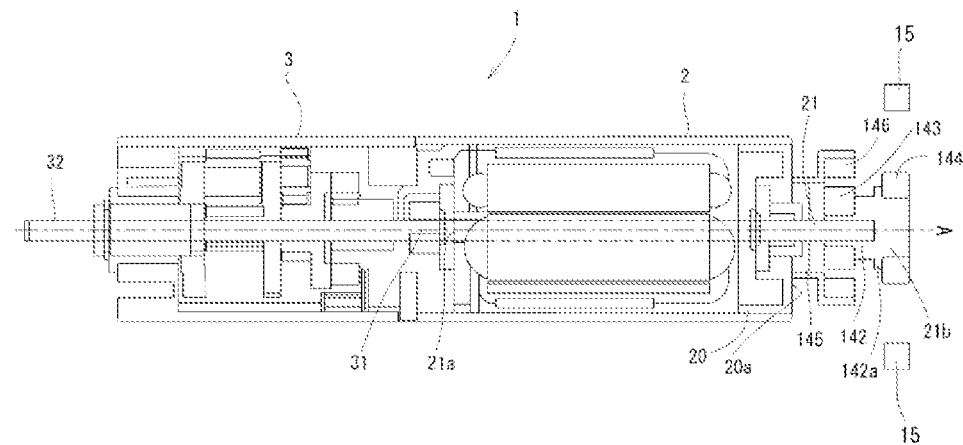

[FIG.11]
(A)
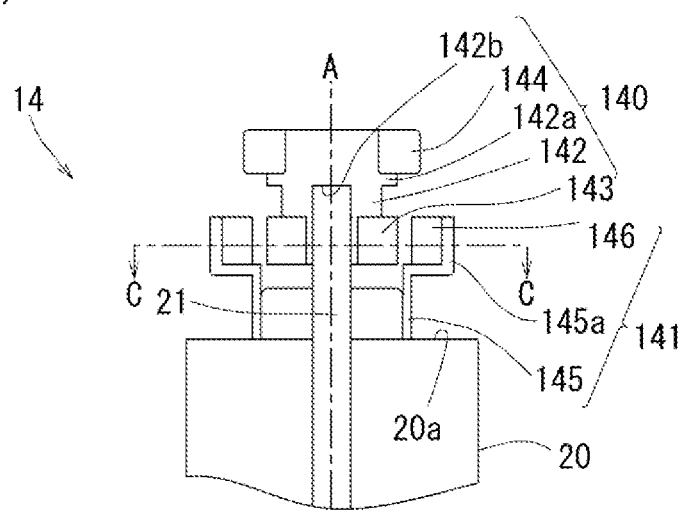
(B)
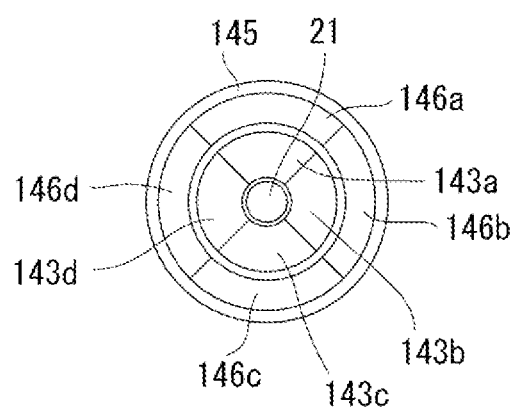

[FIG.12]
(A)
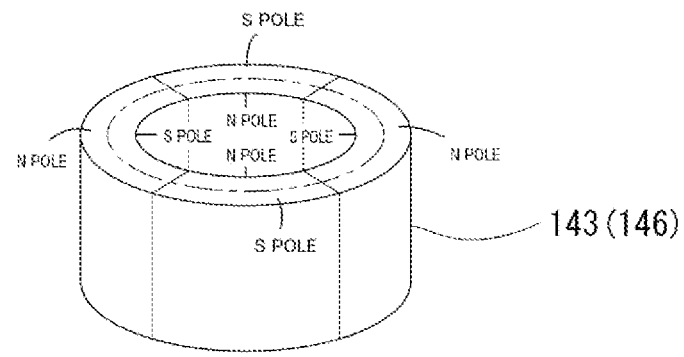
(B)
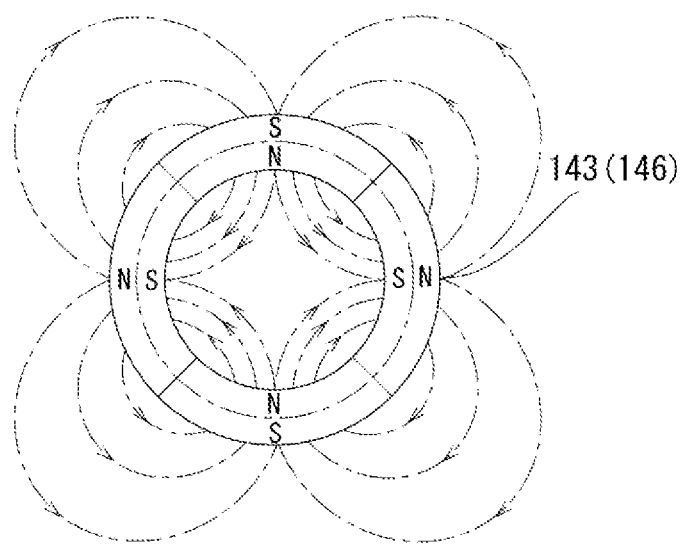

[FIG.13]
(A)
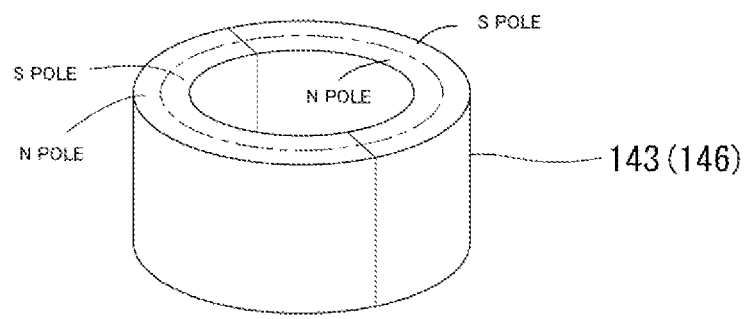
(B)
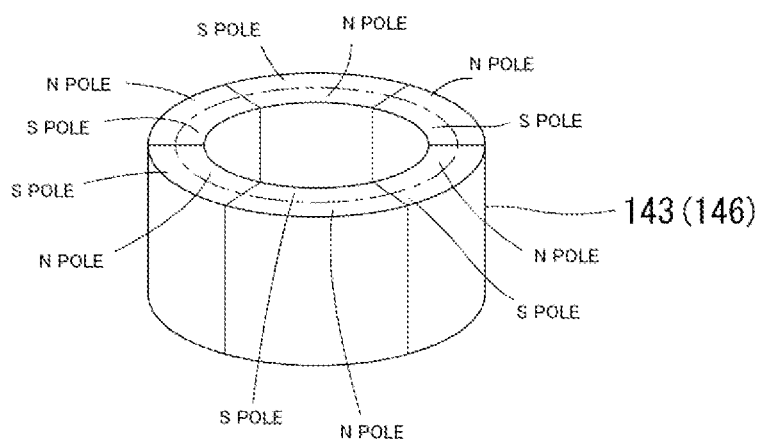

[FIG.14]
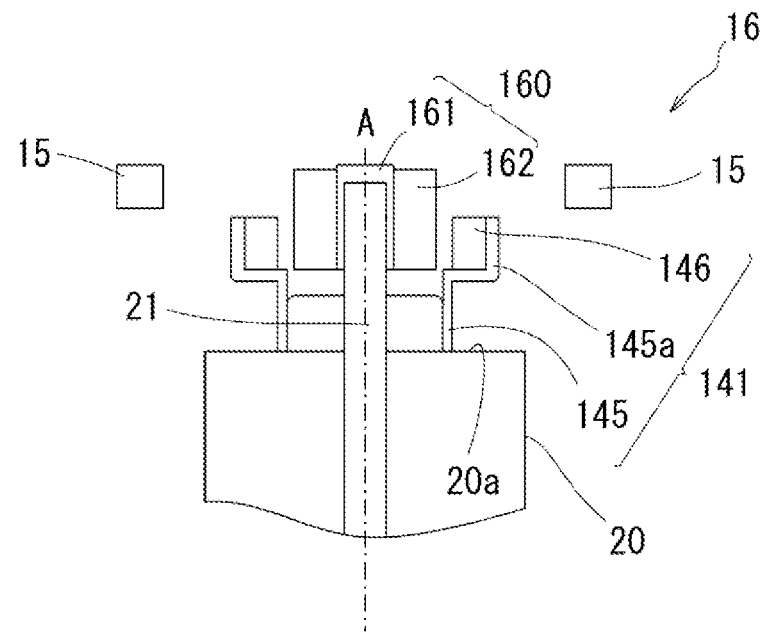
[FIG.15]
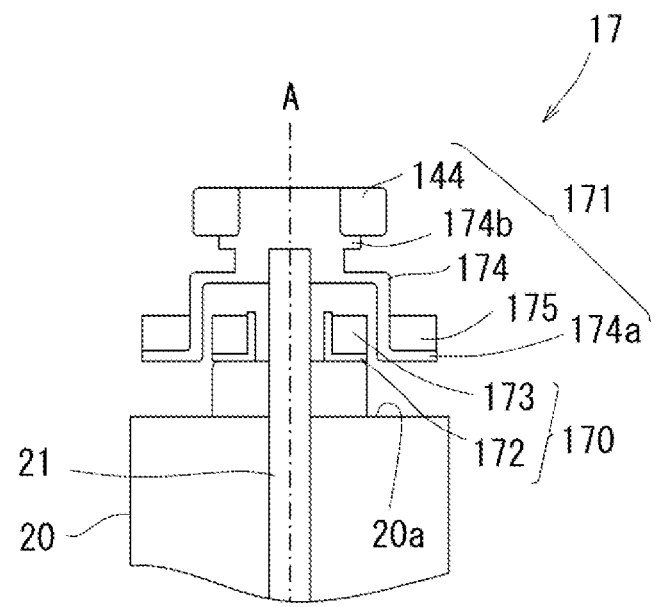

GEARED MOTOR DRIVE CONTROL MECHANISM

TECHNICAL FIELD

The present invention relates to a drive control mechanism of a geared motor that perform control, with control braking means, for the geared motor in which an electric motor and a speed change unit are integrated, and more particularly to a geared motor drive control mechanism having this braking means improved.

BACKGROUND ART

Conventionally, as this type of geared motor drive control mechanism, there are a large number of mechanisms that perform braking control by magnetic means such as an electromagnetic force, or perform braking by mechanical means such as a sprocket and a belt. The braking control by the magnetic means is disclosed in Patent Literatures 1 and 2, and the braking control by the mechanical means is disclosed in Patent Literatures 3 and 4.

A drive control mechanism of a geared motor disclosed in Patent Literature 1 includes a configuration in which in a state where a brake coil is not energized, a brake disc is pressed and restrained against an armature and a side plate by a force of a coil spring, whereas when the brake coil is energized, an armature is attracted to a field by a magnetic attraction force, and the brake disc is rotatable, to release a brake. In this brake disc, magnetic teeth are provided on an inner periphery, and a permanent magnet is disposed to face the teeth via a gap and a can, and is magnetically connected. When this brake coil is energized, the armature is attracted to the field by the magnetic attraction force, and the brake coil become rotatable, to release the brake.

Also, in a drive control mechanism of a geared motor disclosed in Patent Literature 2 in which a braking force is generated with an electromagnetic coil and a compression spring, when non-energized in a non-excited state, an armature is brought into contact under pressure with a rotor by a spring force of a compression spring, and the rotor is sandwiched between the armature and a fixing plate to perform a braking operation, whereas when energized in an excited state, the armature is attracted, and moved away from the rotor to release the braking operation.

Also, a drive control mechanism of a geared motor disclosed in Patent Literature 3 has a configuration in which control is performed by engagement with teeth of a ratchet gear, which is formed of a rotating member in which a winding shaft of a shutter curtain or the like and a sprocket wheel are integrated.

Further, a drive control mechanism of a geared motor disclosed in Patent Literature 4 is for use as an anti-fall protection device of a flexible curtain, and configured to perform control by bringing a band brake into contact with a pulley fixed to a drive shaft of the flexible curtain.

Furthermore, a drive control mechanism of a geared motor disclosed in Patent Literature 5 is disposed as a drive coupling mechanism between a winding shaft of a shutter and an electric motor, housed in an internal space of the winding shaft, and configured to couple the winding shaft and the motor shaft by an elastic force of a spring. The drive coupling mechanism is provided with a first shaft having an outer diameter about the same as an inner diameter of the winding shaft, and the first shaft and a fixing band are coupled via the winding shaft, so that the first shaft is coupled to the winding shaft.

CITATION LIST

Patent Literature

Patent Literature 1: Japanese Patent Laid-Open No. 2011-144854
Patent Literature 2: Japanese Patent Laid-Open No. 2007-77719
Patent Literature 3: Japanese Patent Laid-Open No. 2010-189913
Patent Literature 4: Japanese Translation of PCT International Application Publication No. 2013-500413
Patent Literature 5: Japanese Patent Laid-Open No. 2010-24752

SUMMARY OF INVENTION

Technical Problem

Since each of conventional drive control mechanisms of geared motors is configured as described above, the mechanism has problems that a motor is stopped between a start point and an end point in a drive range if a control signal or a driving force is not inputted from outside and that maintenance of this stopped state, and starting from this stopped state cannot be smoothly and reliably executed.

In particular, the drive control mechanism of the geared motor described in Patent Literature 1 has to supply a current that excites a brake coil in addition to a current that drives an electric motor, and has problems that current consumption increases, and particularly at the start, an amount of current to generate a magnetic attraction force against a force of a coil spring and a magnetic force of a permanent magnet is required.

Also, the drive control mechanism of the geared motor described in Patent Literature 2 has to separately supply a current that excites an electromagnetic coil in addition to a drive current of an electric motor in the same manner as in Patent Literature 1, and has problems that a control operation becomes complicated and current consumption increases.

Further, each of the drive control mechanisms of the geared motors described in Patent Literatures 3 to 5 has problems that a mechanical configuration is complicated and manufacturing cost of a device cannot be reduced.

An object of the present invention, which has been made to solve each of the above problems, is to provide a drive control mechanism of a geared motor that is capable of decelerating a rotation output of an electric motor by a speed change unit to output a driving force of the geared motor, executing a stopping operation between a start point and an end point in a drive range by this driving force, maintaining this stopping operation, and smoothly and reliably executing respective operations that start from this stopped state without applying any external force other than a drive input of the electric motor.

Solution to Problem

A drive control mechanism of a geared motor according to the present invention is a drive control mechanism of a geared motor including the geared motor formed by integrating an electric motor with a speed change unit including an input shaft that is a drive shaft of the electric motor, and braking means for controlling braking in each of driven and stopped states in an output shaft of the speed change unit, wherein the braking means includes a rotating part rotatably and pivotally supported by the drive shaft of the electric motor, and including a permanent magnet disposed in an annular shape, and a fixing part fixed to a case of the electric motor, and including a permanent magnet disposed facing the permanent magnet of the rotating part with a different polarity in the stopped state, and disposed in an annular shape.

Thus, in the present invention, the braking means includes the rotating part rotatably and pivotally supported by the drive shaft of the electric motor, and including the permanent magnet disposed in the annular shape, and the fixing part fixed to the case of the electric motor, and including the permanent magnet disposed facing the permanent magnet of the rotating part with the different polarity in the stopped state and disposed in the annular shape. Therefore, by applying, to the rotating part, an inertial force in a tangential direction depending on a rotation speed only with control of supplying a drive current to the electric motor, the permanent magnet of the rotating part and the permanent magnet of the fixing part can be controlled to be separated from and attracted to each other, and there is an effect that it is possible to perform a stopping operation between a start point and an end point in a drive range by a driving force, maintain this stopping operation, and smoothly and reliably execute respective operations that start from this stopped state without applying any external force other than a drive input of the electric motor. Operations of stopping and starting the electric motor can be executed in a non-contact state of the rotating part and the fixing part, and hence there is also an effect of excellent quietness.

In the drive control mechanism of the geared motor according to the present invention, as required, the braking means includes a rotating part rotatably and pivotally supported by the drive shaft of the electric motor, and including one permanent magnet, and a fixing part fixed to the case of the electric motor, and including another permanent magnet disposed facing the one permanent magnet of the rotating part with a different polarity in the stopped state.

Thus, in the present invention, the braking means includes the rotating part rotatably and pivotally supported by the drive shaft of the electric motor, and including the one permanent magnet, and the fixing part fixed to the case of the electric motor, and including the other permanent magnet disposed facing the one permanent magnet of the rotating part with the different polarity in the stopped state. Therefore, by applying, to the rotating part, the inertial force in the tangential direction depending on the rotation speed of the electric motor only with control of supplying the drive current to the electric motor, the one permanent magnet of the rotating part and the other permanent magnet of the fixing part can be controlled to be separated from and attracted to each other, and there is an effect that it is possible to execute the stopping operation between the start point and the end point in the drive range by the driving force, maintain this stopping operation, and smoothly and reliably execute the respective operations that start from this stopped state without applying any external force other than the drive input of the electric motor. The operations of stopping and starting the electric motor can be executed in the non-contact state of the rotating part and the fixing part, and hence there is also an effect of excellent quietness.

In the drive control mechanism of the geared motor according to the present invention, as necessary, one end side of the drive shaft of the electric motor is the input shaft of the speed change unit, and the rotating part of the braking means is disposed on the other end side of the drive shaft.

Thus, according to the present invention, in the drive control mechanism of the geared motor, one end side of the drive shaft of the electric motor is the input shaft of the speed change unit, and the rotating part of the braking means is disposed on the other end side of the drive shaft. Therefore, to control a large torque output by the speed change unit, which is an output from the geared motor, the braking means can drive and control the drive shaft of a small torque output with high-speed rotation from the electric motor, which provides an effect that it is possible to smoothly and reliably execute respective operations of starting and stopping the braking means and maintaining a stopped state with a machine configuration that is as simple as possible and disposed away from the speed change unit.

In the drive control mechanism of the geared motor according to the present invention, as necessary, one permanent magnet of the rotating part and another permanent magnet of the fixing part are arranged by aligning polarities in a radial direction around the drive shaft, and matching polarities adjacent to each other in a circumferential direction.

Thus, according to the present invention, in the drive control mechanism of the geared motor, the one permanent magnet of the rotating part and the other permanent magnet of the fixing part are arranged by aligning the polarities in the radial direction around the drive shaft and matching the polarities adjacent to each other in the circumferential direction. Therefore, it is possible to perform drive control by a drive control force due to an attraction force generated between one permanent magnet of the rotating part and the other permanent magnet of the fixing part in all the parts arranged to face each other, and there is an effect that it is possible to execute and maintain the stopping operation smoothly and reliably.

In the drive control mechanism of the geared motor according to the present invention, as necessary, one permanent magnet of the rotating part and another permanent magnet of the fixing part are arranged by aligning polarities in a radial direction around the drive shaft, and with different polarities adjacent to each other in a circumferential direction.

Thus, according to the present invention, in the drive control mechanism of the geared motor, the one permanent magnet of the rotating part and the other permanent magnet of the fixing part are arranged by aligning the polarities in the radial direction around the drive shaft, and with the different polarities adjacent to each other in the circumferential direction. Therefore, drive control can be achieved not only by the drive control force due to the attraction force between the one permanent magnet of the rotating part and the other permanent magnet of the fixing part that are arranged to face each other during the stopping operation, but also by a drive control force due to a repulsion force of the one permanent magnet of the rotating part and another permanent magnet adjacent to the other permanent magnet of the fixing part. There is an effect that it is possible to smoothly and reliably execute and maintain the stopping operation, use, as a rotational force of the drive shaft, the repulsion force of one permanent magnet of the rotating part against the other permanent magnet of the fixing part when the drive shaft rotates in the starting operation, and smoothly and reliably execute the starting operation.

In the drive control mechanism of the geared motor according to the present invention, as necessary, an area of each of facing magnetic pole surfaces of one permanent magnet of the rotating part and another permanent magnet of the fixing part is smaller than an area of an opposite magnetic pole surface to the magnetic pole surface.

Thus, according to the present invention, in the drive control mechanism of the geared motor, since the area of each of the facing magnetic pole surfaces of the one permanent magnet of the rotating part and the other permanent magnet of the fixing part is smaller than the area of the opposite magnetic pole surface to the magnetic pole surface, a magnetic flux density in a magnetic field on a fixing part side increases in the one permanent magnet of the rotating part, and a magnetic flux density in a magnetic field on a rotating part side increases in the other permanent magnet of the fixing part. Therefore, an attraction force acting between the rotating part and the fixing part increases, and there is an effect that it is possible to execute and maintain the stopping operation smoothly and reliably.

In the drive control mechanism of the geared motor according to the present invention, as necessary, the rotating part of the braking means includes a storage part formed to store the one permanent magnet, and having a central axis shifted with respect to a radial axis of the drive shaft of the electric motor.

Thus, according to the present invention, in the drive control mechanism of the geared motor, since the rotating part of the braking means includes the storage part formed to store the one permanent magnet, and having the central axis shifted with respect to the radial axis of the drive shaft of the electric motor, in the stopped state, the motor is stopped in a state where the one permanent magnet of the rotating part is inclined with respect to the other permanent magnet of the fixing part. A magnetic flux distribution between a front end and a rear end of the one permanent magnet, and the other permanent magnet can be biased to a front end side of the one permanent magnet which is a tip side of a rotating direction. Therefore, there is an effect that it is possible to shift from the stopped state to a starting state smoothly and reliably.

In the drive control mechanism of the geared motor according to the present invention, as necessary, the rotating part of the braking means includes a storage part formed to slidably store one permanent magnet, and having gaps from left and right surfaces of the one permanent magnet in a radial direction.

Thus, according to the present invention, in the drive control mechanism of the geared motor, since the rotating part of the braking means includes the storage part formed to slidably store the one permanent magnet, and having the gaps from the left and right surfaces of the one permanent magnet in the radial direction, the one permanent magnet in each storage part tilts (falls) in a falling direction depending on a rotating direction of the drive shaft driven by the electric motor. Therefore, a tapered gap is formed on a front end side of the one permanent magnet, and the magnetic flux distribution between the front end and the rear end of the one permanent magnet, and the other permanent magnet can be biased to the front end side of the one permanent magnet which is the tip side in the rotating direction, so that it is possible to smoothly and reliably shift from the stopped state to the starting state.

In the drive control mechanism of the geared motor according to the present invention, as necessary, the braking means includes a rotating part formed of an annular body rotatably and pivotally supported by the drive shaft of the electric motor, and including a radially oriented permanent magnet divided into a plurality of portions in a circumferential direction of the annular body, each of the respective divided portions being magnetized in a radial direction, respective adjacent portions having different polarities from each other; and a fixing part formed of an annular body disposed facing a circumferential surface of the rotating part, and fixed to a case of the electric motor, and including a radially oriented permanent magnet divided into a plurality of portions in a circumferential direction of the annular body, each of the respective divided portions being magnetized in a radial direction, respective adjacent portions having different polarities from each other.

Thus, in the present invention, the braking means includes the rotating part formed of the annular body rotatably and pivotally supported by the drive shaft of the electric motor, and including the radially oriented permanent magnet divided into the plurality of portions in the circumferential direction of the annular body, each of the respective divided portions being magnetized in the radial direction, the respective adjacent portions having the different polarities from each other; and the fixing part formed of the annular body disposed facing the circumferential surface of the rotating part, and fixed to the case of the electric motor, and including the radially oriented permanent magnet divided into the plurality of portions in the circumferential direction of the annular body, each of the respective divided portions being magnetized in the radial direction, the respective adjacent portions having the different polarities from each other. Therefore, the radially oriented permanent magnets of the annular bodies arranged facing each other with the different polarities coaxially inside and outside the drive shaft of the electric motor or the output shaft of the speed change unit attract each other, which provides an effect that it is possible to execute the stopping operation between the start point and the end point in the drive range by the driving force, maintain this stopping operation, and smoothly and reliably execute the respective operations that start from this stopped state without applying any external force other than the drive input of the electric motor.

In the drive control mechanism of the geared motor according to the present invention, as necessary, one end side of the drive shaft of the electric motor is the input shaft of the speed change unit, and the rotating part of the braking means is disposed on the other end side of the drive shaft.

Thus, according to the present invention, in the drive control mechanism of the geared motor, the one end side of the drive shaft of the electric motor is the input shaft of the speed change unit, and the rotating part of the braking means is disposed on the other end side of the drive shaft. Therefore, to control the large torque output from the speed change unit, which is the output from the geared motor, the braking means can drive and control the drive shaft of the small torque output with the high-speed rotation from the electric motor, and there is an effect that it is possible to smoothly and reliably execute the respective operations of starting and stopping and maintaining the stopped state with the machine configuration that is as simple as possible.

In the drive control mechanism of the geared motor according to the present invention, as necessary, the radially oriented permanent magnet of the rotating part is magnetized so that a magnetic field formed by a magnetic pole on a side of the fixing part is stronger than a magnetic field formed by a magnetic pole on a side opposite to the fixing part side.

Thus, in the present invention, in the drive control mechanism of the geared motor, the radially oriented permanent magnet of the rotating part is magnetized so that the magnetic field formed by the magnetic pole on the side of the fixing part is stronger than the magnetic field formed by the magnetic pole on the side opposite to the fixing part side. Therefore, a magnetic force acting between the rotating part and the fixing part can be increased, and there is an effect that it is possible to execute and maintain the stopping operation smoothly and reliably.

In the drive control mechanism of the geared motor according to the present invention, as necessary, the radially oriented permanent magnet of the fixing part is magnetized so that a magnetic field formed by a magnetic pole on a side of the rotating part is stronger than a magnetic field formed by a magnetic pole on a side opposite the rotating part side.

Thus, according to the present invention, in the drive control mechanism of the geared motor, since the radially oriented permanent magnet of the fixing part is magnetized so that the magnetic field formed by the magnetic pole on the side of the rotating part is stronger than the magnetic field formed by the magnetic pole on the side opposite to the rotating part side, a magnetic force acting between the rotating part and the fixing part can be increased. There is an effect that it is possible to execute and maintain the stopping operation smoothly and reliably.

In the drive control mechanism of the geared motor according to the present invention, as necessary, the radially oriented permanent magnet of the rotating part functions as a permanent magnet for a magnetic encoder.

Thus, according to the present invention, in the drive control mechanism of the geared motor, since the radially oriented permanent magnet of the rotating part functions as the permanent magnet for the magnetic encoder, the permanent magnet for the magnetic encoder is unnecessary. There is an effect that it is possible to reduce the number of members of the braking means, simplify the configuration and be easier to assemble.

BRIEF DESCRIPTION OF DRAWINGS

FIG. 1 is an overall perspective view in a case where a drive control mechanism of a geared motor according to a first embodiment of the present invention is applied to an automatic lifting curtain.

FIG. 2 is a partial cross-sectional view of the geared motor in the drive control mechanism of the geared motor described in FIG. 1.

FIG. 3, which includes FIGS. 3A and 3B, shows a partial cross-sectional view of braking means in the drive control mechanism of the geared motor described in FIG. 2 and a B-B line end view in the partial cross-sectional view.

FIG. 4 is an end view of braking means in a geared motor according to a second embodiment of the present invention.

FIG. 5 is an end view of braking means in a geared motor according to a third embodiment of the present invention.

FIG. 6 is a partial cross-sectional view of a geared motor in a drive control mechanism of the geared motor according to a fourth embodiment of the present invention.

FIG. 7, which includes FIGS. 7A and 7B, shows an end view of braking means in a geared motor according to a fifth embodiment of the present invention, and an operation mode diagram.

FIG. 8, which includes FIGS. 8A and 8B, shows an end view of braking means in a geared motor according to a sixth embodiment of the present invention, and an operation mode diagram.

FIG. 9 is an end view of braking means in a geared motor according to a seventh embodiment of the present invention.

FIG. 10 is a partial cross-sectional view of a geared motor in a drive control mechanism of the geared motor according to an eighth embodiment of the present invention.

FIG. 11, which includes FIGS. 11A and 11B, shows a partial cross-sectional view of braking means in a drive control mechanism of a geared motor described in FIG. 10, and a C-C line end view in the partial cross-sectional view.

FIG. 12, which includes FIGS. 12A and 12B, is a schematic view showing an example of a radially oriented permanent magnet.

FIG. 13, which includes FIGS. 13A and 13B, is a schematic view showing another example of the radially oriented permanent magnet.

FIG. 14 is a partial cross-sectional view of a geared motor in a drive control mechanism of the geared motor according to a ninth embodiment of the present invention.

FIG. 15 is a partial cross-sectional view of a geared motor in a drive control mechanism of the geared motor according to a tenth embodiment of the present invention.

DESCRIPTION OF EMBODIMENTS

Hereinafter, embodiments of the present invention will be described. Further, the same element is denoted with the same sign throughout the present embodiment.

First Embodiment

A drive control mechanism of a geared motor according to an embodiment of the present invention will be described with reference to FIGS. 1 to 3. Here, FIG. 1 is an overall perspective view in a case where the drive control mechanism of the geared motor according to the present embodiment is applied to an automatic lifting curtain, FIG. 2 is a partial cross-sectional view of the geared motor in the drive control mechanism of the geared motor, and FIG. 3 shows a partial cross-sectional view of braking means in the drive control mechanism of the geared motor and a B-B line end view in the partial cross-sectional view.

The drive control mechanism of the geared motor according to the present embodiment includes a geared motor formed by integrating an electric motor with a speed change unit including an input shaft that is a drive shaft of the electric motor, and braking means for controlling braking in each of driven and stopped states in an output shaft of the speed change unit, wherein the braking means includes a rotating part rotatably and pivotally supported by the drive shaft of the electric motor, and including a permanent magnet disposed in an annular shape, and a fixing part fixed to a case of the electric motor, and including a permanent magnet disposed facing the permanent magnet of the rotating part with a different polarity in the stopped state, and disposed in an annular shape.

More specifically, as shown in FIGS. 1 to 3, the drive control mechanism of a geared motor 1 includes an electric motor 2 that generates a rotational force required for driving a lifting operation in a lifting curtain 100; a speed change unit 3 including an input shaft 31 on one end side 21a of a drive shaft 21 in the electric motor 2 to decrease a speed of the rotational force, the speed change unit using this decelerated rotational force to generate, from an output shaft 32, a torque corresponding to the lifting operation of the lifting curtain 100; and braking means 4 disposed on another end side 21b of the drive shaft 21 in the electric motor 2, for controlling braking in each of driven and stopped states in the output shaft 32 of the speed change unit 3 by arranging one permanent magnet 43 rotatably and pivotally supported by the drive shaft 21 of the electric motor 2 and another permanent magnet 45 fixed to a case 20 of the electric motor 2 so that the permanent magnets face each other with different polarities in the stopped state of the electric motor.

The braking means 4 may be provided between the electric motor 2 and the speed change unit 3.

The braking means 4 includes a rotating part 40 rotatably and pivotally supported by the drive shaft 21 of the electric motor 2, and including the one permanent magnet 43 having a rectangular parallelepiped shape, and a fixing part 41 disposed on an outer side of the rotating part 40 offset to an electric motor 2 side to face a circumferential surface of the rotating part 40, fixed to the case 20 of the electric motor 2, and including the other permanent magnet 45 having a rectangular parallelepiped shape.

The rotating part 40 consists of a disc-shaped body of a nonmagnetic material, and includes a storage part 42 including a plurality of cylindrical recesses arranged at equal intervals (each 90°) radially from a center of the disc-shaped body (drive shaft 21), and the one permanent magnet 43 (43a to 43d) having the rectangular parallelepiped shape and contained and fixed in the storage part 42. The one permanent magnet 43a to 43d is arranged so that polarities are aligned along a radial direction around the drive shaft 21, and all polarities adjacent to each other in a circumferential direction on a fixing part 41 side are the same polarity (e.g., N pole).

The rotating part 40 has the center of the disc-shaped body pivotally supported by the drive shaft 21 of the electric motor 2, and is fixed rotatably with the rotation of the drive shaft 21.

The fixing part 41 consists of a doughnut-shaped nonmagnetic material concentric with the rotating part 40 around the drive shaft 21, and includes a storage part 44 including a plurality of cylindrical recesses arranged at equal intervals (each 90°) radially from a center of the drive shaft, and the other permanent magnet 45 (45a to 45d) having the rectangular parallelepiped shape and contained and fixed in the storage part 44. The other permanent magnet 45a to 45d is arranged so that polarities are aligned along the radial direction around the drive shaft 21, and all polarities adjacent to each other in the circumferential direction on a rotating part 40 side are the same polarity and different (e.g., S pole) from those of the one permanent magnet 43a to 43d of the facing rotating part 40.

The fixing part 41 is fixed to the case of the electric motor 2 on a one end face 20a side.

The rotating part 40 and the fixing part 41 are always in a non-contact state via a gap regardless of an operation (driving or stopping) of the electric motor 2.

In addition, an example shown in FIG. 3 is an example where four permanent magnets 43a to 43d, 45a to 45d are arranged in each of the rotating part 40 and the fixing part 41, but three or another odd permanent magnets, or eight or another even permanent magnets may be arranged in each of the rotating part 40 and the fixing part 41, and the number of the magnets to be installed is not particularly limited. From the viewpoint of suppressing noise caused by vibration of the permanent magnets 43a to 43d, 45a to 45d due to attraction among the permanent magnets 43a to 43d and 45a to 45d in the rotating part 40 and the fixing part 41, magnetic forces of the individual permanent magnets 43a to 43d, 45a to 45d may be weakened and the number of the magnets to be installed may be increased. Therefore, as the permanent magnets 43a to 43d and 45a to 45d in the present embodiment, not only sintered magnets such as neodymium magnets but also plastic magnets and the like with a weaker magnetic force can be used.

Further, the number of the permanent magnets to be installed can be different between the rotating part 40 and the fixing part 41. For example, four permanent magnets can be installed in the rotating part 40 and eight permanent magnets can be installed in the fixing part 41.

Furthermore, as the shape of the permanent magnets 43a to 43d, 45a to 45d, a permanent magnet having a rectangular parallelepiped shape is shown, but if the polarity is opposite between the rotating part 40 and the fixing part 41 during the stopping operation, the shape is not particularly limited, and may be a rectangular column shape with a trapezoidal bottom surface, a spherical shape, or the like.

Next, a control operation of automatically operating the lifting curtain 100 in the drive control mechanism of the geared motor 1 according to the present embodiment will be described.

First, the control operation of automatically operating the lifting curtain 100 will be described.

First, when the lifting curtain 100 is in an open state, a curtain lower end 103 is located at a top 100H of a drive range W, no current is supplied to the electric motor 2 in a stopped state, and the one permanent magnet 43a to 43d in the rotating part 40 of the braking means 4 is attracted by the magnetic field of the other permanent magnet 45a to 45d of the fixing part 41. The electric motor 2 is prevented from rotating and the lifting curtain 100 is maintained in the open state.

When the curtain lower end 103 in the open state by the lifting curtain 100 is located at the top 100H of the drive range W and a shielding operation is instructed from the drive control unit 200, a drive current is supplied from a power supply unit (not shown) to the electric motor 2. The supplying of this drive current starts rotation drive of the electric motor 2, generates an inertial force in a tangential direction in the rotating part 40 that rotates with the drive shaft 21 of the electric motor 2, releases an attracting state of the other permanent magnet 45a to 45d of the fixing part 41, and releases a braked state by the braking means 4.

The releasing of the braked state by the braking means 4 brings the drive shaft 21 of the electric motor 2 into a free state, and the drive rotation of the electric motor 2 is inputted from the input shaft 31 via the drive shaft 21. The speed change unit 3 decelerates this inputted rotational force, and converts the force to a torque required for the lifting operation of the lifting curtain 100. By this converted rotational force, a lifting shaft 102 of the lifting curtain 100 is rotated to wind out a curtain 101 for shielding.

In the middle of this shielding operation, when the drive control unit 200 instructs that the curtain 101 is stopped at a middle portion 100M and a semi-shielded state by the curtain 101 is maintained, any more current is not supplied from the power supply unit (not shown) to the electric motor 2, the rotational speed of the electric motor 2 is attenuated, the inertial force in the tangential direction caused by the braking means 4 is rapidly reduced, and braking of the braking means 4 works with an attraction force between the permanent magnets 43a to 43d and 45a to 45d.

When the braking of the braking means 4 works, the curtain lower end 103 can maintain the stopped state at the middle portion 100M, and the lifting curtain 100 can be in the semi-shielded state.

Furthermore, when the drive control unit 200 instructs that this semi-shielded state is shifted to a totally shielded state, the current supply from the power supply unit (not shown) to the electric motor 2 is started, and drive control is performed to a bottom 100L in the same manner as in a starting operation from the top 100H of the drive range W.

In the above, description has been made as to the shielding operation of the lifting curtain 100 from the top 100H to the middle portion 100M, and from this middle portion 100M to the bottom 100L in the drive range W. An opening operation from the bottom 100L to the middle portion 100M, and from the middle portion 100M to the top 100H in the drive range W can be similarly executed for control.

By the way, a relation among a drive torque F1 of the electric motor 2, a drive torque F2 for winding up (or winding out) the lifting curtain 100 and an attraction force F3 between the rotating part 40 and the fixing part 41 in the braking means 4 can be represented by the following formula.

$$F1>F3>F2$$

The drive control mechanism of the geared motor 1 according to the present embodiment within a range where the relation among the drive torque F1, the drive torque F2 and the attraction force F3 is maintained can control any of the opening and shielding operations in the drive range W of the lifting curtain 100 only with on/off control of the supply current from the drive control unit 200 to the electric motor 2.

Second Embodiment

A drive control mechanism of a geared motor according to another embodiment of the present invention will be described with reference to FIG. 4. FIG. 4 is an end view of braking means in the geared motor according to the present embodiment.

In the present embodiment, a description that overlaps with that of the above first embodiment is omitted.

In a rotating part 40 of braking means 5, one permanent magnet 53a to 53d is arranged in a storage part 42 so that polarities are aligned along a radial direction around a drive shaft 21, and polarities adjacent to each other in a circumferential direction on a fixing part 41 side that is an outer side in the radial direction alternately differ.

Similarly, in the fixing part 41, another permanent magnet 55a to 55d is arranged in a storage part 44 so that polarities are aligned along the radial direction around the drive shaft 21, and polarities adjacent to each other in the circumferential direction on a rotating part 40 side that is an inner side in the radial direction alternately differ.

According to the above configuration, for example, not only a drive control force due to an attraction force between the polarity (e.g., N pole) of the one permanent magnet 53a of the rotating part 40 and the polarity of the other permanent magnet 55a of the fixing part 41 (e.g., S pole), the magnets being arranged to face each other during a stopping operation, but also a drive control force due to a repulsion force between the N pole of the one permanent magnet 53a of the rotating part 40 and the N pole on the rotating part 40 side of the other permanent magnet 55b adjacent to the other permanent magnet 55a of the fixing part 41 enable smooth and reliable execution and maintenance of the stopping operation (here, a rotating direction of the drive shaft 21 is clockwise (rotating direction X)).

In a starting operation, for example, a repulsion force between the N pole of the one permanent magnet 53a of the rotating part 40 and the N pole of the other permanent magnet 55a of the fixing part 41 can be used as a rotational force of the drive shaft, and the starting operation can be smoothly and reliably executed.

In the present embodiment, from the viewpoint of stop position accuracy in the stopping operation, it is preferable to arrange an even number of permanent magnets so that the polarity on the fixing part 41 side of the one permanent magnet 53a to 53d in the rotating part 40 and the polarity on the rotating part 40 side of the other permanent magnet 55a to 55d in the fixing part 41 are alternated. Alternatively, the number of the permanent magnets to be arranged in the rotating part 40 and the fixing part 41 may be an odd number, and there may be a portion in which some of polarities adjacent to each other are the same polarity.

Third Embodiment

A drive control mechanism of a geared motor according to another embodiment of the present invention will be described with reference to FIG. 5. FIG. 5 is an end view of braking means in the geared motor according to the present embodiment.

In the present embodiment, a description that overlaps with that of each of the above embodiments is omitted.

One permanent magnet 63a to 63d of a rotating part 40 in braking means 6 has a square column shape with an isosceles trapezoidal bottom surface facing in a drive shaft 21 direction, and a surface 66 including an upper bottom and a surface 67 including a lower bottom are magnetic pole surfaces, respectively. The magnetic pole surfaces 66 and 67 are arranged in a storage part 62 to be aligned along a radial direction around the drive shaft 21.

An area of the magnetic pole surface 66 including the upper bottom on a side facing another permanent magnet 65a to 65d of a fixing part 41 is smaller than an area of the magnetic pole surface 67 including the lower bottom on an opposite side (inner side in the radial direction).

Similarly, the other permanent magnet 65a to 65d of the fixing part 41 has a square column shape with an isosceles trapezoidal bottom surface facing in the drive shaft 21 direction, and a surface 68 including an upper bottom and a surface 69 including a lower bottom are magnetic pole surfaces, respectively. The magnetic pole surfaces 68 and 69 are arranged in a storage part 64 to be aligned along the radial direction around the drive shaft 21.

An area of the magnetic pole surface 69 including the lower bottom on a side facing the one permanent magnet 63a to 63d of the rotating part 40 is smaller than an area of the magnetic pole surface 68 including the upper bottom on an opposite side (outer side in the radial direction).

Thereby, in the one permanent magnet 63a to 63d of the rotating part 40, a magnetic field becomes stronger because a magnetic flux density of the magnetic pole surface 66 including an upper bottom on a fixing part 41 side increases, and in the other permanent magnet 65a to 65d of the fixing part 41, the magnetic field becomes stronger because a magnetic flux density of the magnetic pole surface 69 including the lower bottom on a rotating part 40 side increases. Therefore, an attraction force acting between the rotating part 40 and the fixing part 41 can be increased, and a stopping operation can be smoothly and reliably executed and maintained.

In the above, a case where the permanent magnets 63a to 63d and 65a to 65d of both of the rotating part 40 and the fixing part 41 have the square column shape with the isosceles trapezoidal bottom surface has been described, but the permanent magnets only of one of the parts may have the square column shape. Further, the shape of the permanent magnets 63a to 63d and 65a to 65d of the rotating part 40 and the fixing part 41 is not limited to the square column shape with the isosceles trapezoidal bottom surface, and may be any shape, if an area of the magnetic pole surface on a side where the permanent magnets 63a to 63d and 65a to 65d of the rotating part 40 and the fixing part 41 face each other is smaller than an area of the opposite magnetic pole surface, and a magnetic field of the magnetic pole surfaces facing each other becomes strong.

Furthermore, for example, in a rectangular parallelepiped permanent magnet, when magnetizing an unmagnetized magnet material as a molded body at a manufacturing stage of the permanent magnet, arrangement, strength or the like of a pulse magnetic field may be controlled, to increase a magnetic flux density in the magnetic field of the magnetic pole surface on the side where the permanent magnets of the rotating part 40 and the fixing part 41 face each other.

Fourth Embodiment

A drive control mechanism of a geared motor according to another embodiment of the present invention will be described with reference to FIG. 6. FIG. 6 is a partial cross-sectional view of the geared motor in the drive control mechanism of the geared motor according to the present embodiment.

In the present embodiment, a description that overlaps with that of each of the above embodiments is omitted.

Braking means 7 includes a rotating part 70 rotatably and pivotally supported by a drive shaft 21 of an electric motor 2, and including one permanent magnet 74 having a rectangular parallelepiped shape, and a fixing part 71 disposed inside offset to an electric motor 2 side of the rotating part 70 to face a circumferential surface of the rotating part 70 and fixed to a case 20 of the electric motor 2, and including another permanent magnet 76 having a rectangular parallelepiped shape.

The rotating part 70 consists of a substantially disc-shaped body of a nonmagnetic material, and includes a storage part 73 including a plurality of cylindrical recesses arranged at equal intervals (each 90°) radially from a center of the disc-shaped body (drive shaft 21), and disposed on an outer side of a disc portion 72 offset to the electric motor 2 side, and the one permanent magnet 74 having the rectangular parallelepiped shape and contained and fixed in the storage part 73. The one permanent magnet 74 is disposed so that polarities are aligned along a radial direction around the drive shaft 21, and all polarities adjacent to each other in a circumferential direction on a fixing part 71 side are the same polarity (e.g., N pole).

The fixing part 71 consists of a doughnut-shaped nonmagnetic material fixed to a protrusion 20b of the electric motor 2, and includes a storage part 75 including a plurality of cylindrical recesses arranged at equal intervals (each 90°) radially from a center of the doughnut shape (drive shaft 21), and the other permanent magnet 76 having a rectangular parallelepiped shape and contained and fixed in the storage part 75. The other permanent magnet 76 is disposed so that polarities are aligned along the radial direction around the drive shaft 21, and all polarities adjacent to each other in the circumferential direction on a rotating part 70 side are the same polarity and different (e.g., S pole) from the polarity of the one permanent magnet 74 of the facing rotating part 70.

In the drive control mechanism of the geared motor 1 according to the present embodiment, similarly to the drive control mechanism of the geared motor 1 according to the above first embodiment, it is possible to decelerate a rotation output of the electric motor 2 by a speed change unit 3 and output a driving force of the geared motor 1, execute a stopping operation between a start point and an end point in a drive range by this driving force, maintain this stopping operation, and smoothly and reliably execute respective operations that start from this stopped state without applying any external force other than a drive input of the electric motor 2.

Fifth Embodiment

A drive control mechanism of a geared motor according to another embodiment of the present invention will be described with reference to FIG. 7. FIG. 7 shows an end view of braking means in the geared motor according to the present embodiment, and an operation mode diagram.

In the present embodiment, a description that overlaps with that of each of the above embodiments is omitted.

Braking means 8 includes a common configuration in which one permanent magnet 43 is contained in each storage part 81 of a rotating part 40, and a fixing part 41 including another permanent magnet 45 is disposed in a circle concentric with the rotating part 40, and a central axis (plane arrangement) of the one permanent magnet 43 and each storage part 81 is shifted by a very small amount a from a radial axis around a drive shaft 21 of an electric motor 2.

Thus, according to an original configuration where the one permanent magnet 43 and each storage part 81 of the rotating part 40 are shifted from the radial axis, as shown in FIG. 7(B), in a stopped state, the one permanent magnet 43 stops inclined with respect to the other permanent magnet 45 of the fixing part 41, and a magnetic flux distribution between a front end 43e and a rear end 43f of the one permanent magnet 43, and the other permanent magnet 45 can be biased to a front end 43e side of the one permanent magnet 43 which is a tip side of a rotating direction X, so that it is possible to smoothly and reliably shift from the stopped state to a starting state.

Sixth Embodiment

A drive control mechanism of a geared motor according to another embodiment of the present invention will be described with reference to FIG. 8. FIG. 8 shows an end view of braking means in the geared motor according to the present embodiment, and an operation mode diagram.

In the present embodiment, a description that overlaps with that of each of the above embodiments is omitted.

Braking means 9 includes a common configuration where one permanent magnet 43 is slidably contained in each storage part 91 of a rotating part 40, and a fixing part 41 including another permanent magnet 45 is disposed in a circle concentric with the rotating part 40, and each storage part 91 of the rotating part 40 has gaps 91a and 91b formed from left and right surfaces of the one permanent magnet 43 in a radial direction.

Thus, since the gaps 91a and 91b are formed between the one permanent magnet 43 and each storage part 91 to store the one permanent magnet 43, as shown in FIG. 8(B), the one permanent magnet 43 in each storage part 91 tilts (falls) in a falling direction Y depending on a rotating direction X of a drive shaft 21 driven by an electric motor 2. Therefore, a magnetic flux distribution between a front end 43e and a rear end 43f of the one permanent magnet 43, and the other permanent magnet 45 can be biased to a front end 43e side of the one permanent magnet 43 which is a tip side in the rotating direction X, so that it is possible to smoothly and reliably shift from a stopped state to a starting state.

Alternatively, a protrusion may be provided on a surface opposite to the fixing part 41 of the storage part 91 on which the one permanent magnet 43 abuts, and the one permanent magnet 43 may be tilted starting from the protrusion.

Further, each storage part 91 has a substantially rectangular parallelepiped shape, and if at least a part of a surface opposite to the fixing part 41 is tapered or curved, the tilt of the one permanent magnet 43 can be more effectively promoted.

Seventh Embodiment

A drive control mechanism of a geared motor according to another embodiment of the present invention will be described with reference to FIG. 9. FIG. 9 is an end view of braking means in the geared motor according to the present embodiment.

In the present embodiment, a description that overlaps with that of each of the above embodiments is omitted.

In a rotating part 40 of braking means 10, one permanent magnet 203*a* to 203*f* is arranged in a storage part 42 so that polarities are aligned along a radial direction around a drive shaft 21, and all polarities adjacent to each other in a circumferential direction on a fixing part 41 side are the same polarity (e.g., N pole).

In the fixing part 41, another permanent magnet 205*a* to 205*f* is arranged in a storage part 44 so that polarities are aligned along the radial direction around the drive shaft 21, a magnetic pole on a rotating part 40 side has the same polarity as that of the one permanent magnet 203*a* to 203*f* of the rotating part 40 facing the fixing part, and all polarities adjacent to each other in the circumferential direction on the rotating part 40 side that is an inner side in the radial direction are the same polarity (e.g., N pole).

In the drive control mechanism of a geared motor 1 according to the present embodiment, the one permanent magnet 203*a* to 203*f* of the rotating part 40 stops at a position where a repulsion force received from a magnetic field produced by the other permanent magnet 205*a* to 205*f* of the facing fixing part 41 is balanced. For example, in an example shown in FIG. 9, the one permanent magnet 203*a* of the rotating part 40 stops at a middle position in the circumferential direction between the other permanent magnet 205*a* and the other permanent magnet 205*b* in the fixing part 41.

Thus, since drive of the geared motor 1 can be stopped using the repulsion force acting between the one permanent magnet 203*a* to 203*f* of the rotating part 40 and the other permanent magnet 205*a* to 205*f* of the fixing part 41, a stopping operation can be smoothly and reliably executed and maintained.

In particular, the one permanent magnet 203*a* to 203*f* of the rotating part 40 is stopped at the position where the repulsion force received from the magnetic field produced by the other permanent magnet 205*a* to 205*f* of the fixing part 41 is balanced, that is, less influence is received from the magnetic field of the other permanent magnet 205*a* to 205*f*, so that a starting operation of the geared motor 1 can be smoothly executed.

In the above, a case where the number of the magnetic poles of the permanent magnet in each of the rotating part 40 and the fixing part 41 is six has been described, but this case is not limited. For example, more permanent magnets may be installed to perform the stopping operation of the geared motor 1 more smoothly and reliably, and the number of the permanent magnets to be installed is appropriately set in consideration of strength of the magnetic field of the permanent magnet, smooth execution of starting and stopping, and the like.

In each of the above embodiments, it is described that the rotating part is pivotably supported at a fixed position of the drive shaft, but, the rotating part may have a slide function so that the rotating part can slide along the drive shaft in a direction away from the other permanent magnet of the fixing part when the geared motor is in a starting state. In this way, since the rotating part moves away from the fixing part with the rotation of the drive shaft, an area of the facing (overlapping) magnetic pole surface between one permanent magnet of the rotating part and the other permanent magnet of the fixing part gradually decreases, that is, an attraction force acting between the rotating part and the fixing part is reduced, thereby allowing the drive shaft to smoothly rotate at an earlier stage.

Further, when a magnetic encoder is provided in the geared motor, one permanent magnet of the rotating part may be used also as a permanent magnet for the magnetic encoder. At this time, in the one permanent magnet of the rotating part in the first embodiment, the magnetic pole surface is extended along a drive shaft direction from the magnetic pole surface of the other permanent magnet of the fixing part, and an extended magnetic pole surface portion is disposed to face Hall element.

Eighth Embodiment

A drive control mechanism of a geared motor according to another embodiment of the present invention will be described with reference to FIGS. 1, 10 and 11. Here, FIG. 10 is a partial cross-sectional view of the geared motor in the drive control mechanism of the geared motor, and FIG. 11 shows a partial cross-sectional view of braking means in the drive control mechanism of the geared motor and a C-C line end view in the partial cross-sectional view.

The drive control mechanism of the geared motor according to the present embodiment includes the geared motor formed by integrating an electric motor with a speed change unit including an input shaft that is a drive shaft of the electric motor, and braking means for controlling braking in each of driven and stopped states in an output shaft of the speed change unit, and the braking means includes a rotating part rotatably and pivotally supported by the drive shaft of the electric motor, and including a permanent magnet disposed in an annular shape, and a fixing part fixed to a case of the electric motor, and including a permanent magnet disposed facing the permanent magnet of the rotating part with a different polarity in the stopped state, and disposed in an annular shape.

More specifically, as shown in FIGS. 1, 10 and 11, the drive control mechanism of a geared motor 1 includes an electric motor 2 that generates a rotational force required for driving a lifting operation in a lifting curtain 100; a speed change unit 3 including an input shaft 31 that is one end side 21*a* of a drive shaft 21 in the electric motor 2 to decelerate the rotational force, and generates a torque corresponding to the lifting operation of the lifting curtain 100 from an output shaft 32 with the decelerated rotational force; and braking means 14 disposed on the other end side 21*b* of the drive shaft 21 in the electric motor 2, and controlling braking in the output shaft 32 of the speed change unit 3 by arranging a radially oriented permanent magnet 143 rotatably and pivotally supported by the drive shaft 21 of the electric motor 2 and a radially oriented permanent magnet 146 fixed to a case 20 of the electric motor 2 so that the radially oriented permanent magnets face each other.

In the drive control mechanism of the geared motor 1 according to the present embodiment, to control a large torque output by the speed change unit 3 that is an output from the geared motor 1, the braking means 14 can drive and control the drive shaft 21 of a small torque output with high-speed rotation from the electric motor 2, so that it is possible to smoothly and reliably execute respective operations of starting and stopping and maintaining a stopped state with a machine configuration that is as simple as possible.

The braking means 14 may be provided between the electric motor 2 and the speed change unit 3.

The braking means 14 includes a rotating part 140 formed of an annular body rotatably and pivotally supported by the drive shaft 21 of the electric motor 2, and including the radially oriented permanent magnet 143 (143a to 143d) divided into a plurality of portions in a circumferential direction of the annular body, each of the respective divided portions being magnetized in a radial direction, respective adjacent portions having different polarities from each other; and a fixing part 141 formed of an annular body disposed facing a circumferential surface of the rotating part 140 and fixed to the case 20 of the electric motor 2, and including the radially oriented permanent magnet 146 (146a to 146d) divided into a plurality of portions in a circumferential direction of the annular body, each of the respective divided portions being magnetized in a radial direction, respective adjacent portions having different polarities from each other.

The rotating part 140 includes a holding part 142 including a recess 142b formed at one end of a base, and a brim portion 142a formed on an intermediate outer periphery of a side surface of the base, the recess 142b being pivotally supported by the drive shaft 21 around an axis A of the electric motor 2 and rotating with drive of the drive shaft 21; the radially oriented permanent magnet 143 (143a to 143d) disposed in an annular shape fixed to an electric motor 2 side of the holding part 142; and a permanent magnet 144 for a magnetic encoder, disposed facing the radially oriented permanent magnet 143a to 143d via the brim portion 142a of the holding part 142.

The brim portion 142a holds an interval between the radially oriented permanent magnet 143a to 143d and the permanent magnet 144 that are arranged on opposite end sides in the base of the holding part 142 to prevent mutual interference of magnetic fields.

The permanent magnet 144 for the magnetic encoder detects a rotational speed or the like of the electric motor 2 with Hall element 15 disposed on a substrate (not shown) to which the geared motor 1 is fixed.

The fixing part 141 includes a storage part 145 fixed to the case 20 of the electric motor 2 on a one end face 20a side, and including a stepped portion 145a having a diameter increasing toward a side opposite to the electric motor 2, and the annular radially oriented permanent magnet 146 (146a to 146d) fixed to the stepped portion 145a, and disposed outside and facing, via an interval, the radially oriented permanent magnet 143a to 143d of the rotating part 140.

Here, the radially oriented permanent magnet will be described with reference to FIGS. 12 and 13. FIG. 12 is a schematic view showing an example of the radially oriented permanent magnet according to the present embodiment, and FIG. 13 is a schematic view showing another example of the radially oriented permanent magnet.

As shown in FIG. 12, the radially oriented permanent magnets 143 and 146 are inner and outer circumference multipole magnets in each of which a plurality of S and N poles are alternately magnetized along a circumferential direction at an inner circumferential edge and an outer circumferential edge, and different magnetic poles are magnetized in a radial direction. During a stopping operation of the geared motor 1, different magnetic poles of the radially oriented permanent magnets 143 and 146 of the rotating part 140 and the fixing part 141 face each other.

According to the above configuration, not only a drive control force due to an attraction force between the magnetic pole (e.g., N pole) of the radially oriented permanent magnet 143 of the rotating part 140 and the magnetic pole surface (e.g., S pole) of the radially oriented permanent magnet 146 of the fixing part 141, the magnets being arranged facing each other during the stopping operation, but also a drive control force due to a repulsion force of the N pole of the radially oriented permanent magnet 143 of the rotating part 140 and the N pole adjacent to the S pole of the radially oriented permanent magnet 146 of the fixing part 141 enable smooth and reliable execution and maintenance of the stopping operation.

In an example shown in FIG. 12(A), a case where each of the number of the magnetic poles inside the inner and outer circumference multipole magnet and the number of the magnetic poles outside the magnet is four has been described, but as shown in FIG. 13, the even number of poles such as two poles or six poles may be provided.

Thus, since the inner and outer circumference multipole magnet consists of the even number of the poles, the magnetic poles between the adjacent magnets can be different, and the drive control force can be controlled more strongly by applying both the attraction force and the repulsion force of the magnetic poles, and a plurality of annular magnets can be stably and firmly arranged.

Further, the radially oriented permanent magnet 143 of the rotating part 140 preferably has the magnetic field due to the magnetic pole (outside) facing the fixing part 141 that is stronger than the magnetic field due to the opposite magnetic pole (inside).

Similarly, the radially oriented permanent magnet 146 of the fixing part 141 preferably has the magnetic field due to the magnetic pole (inside) facing the rotating part 140 that is stronger than the magnetic field due to the opposite magnetic pole (outside).

As shown in FIG. 12(B), in the inner and outer circumference multipole magnet, the magnetic field is formed between different magnetic poles adjacent to each other in the circumferential direction. Therefore, if the magnetic field formed on the side where the radially oriented permanent magnets 143 and 146 of the rotating part 140 and the fixing part 141 face each other is strengthened, the magnetic force acting between the rotating part 140 and the fixing part 141 can be increased, enabling execution and maintenance of the stopping operation smoothly and reliably.

The strength of the magnetic field of the inner and outer circumference multipole magnet can be adjusted by controlling arrangement, strength or the like of a pulse magnetic field when magnetizing an unmagnetized magnet material as a molded body at a manufacturing stage of the permanent magnet.

Further, from the above, as the radially oriented permanent magnets 143 and 146 of the present embodiment, not only sintered magnets such as neodymium magnets but also plastic magnets having weaker magnetic force can be used.

Next, a control operation for automatically operating the lifting curtain 100 in the drive control mechanism of the geared motor 1 according to the present embodiment will be described.

First, the control operation for automatically operating the lifting curtain 100 will be described.

First, when the lifting curtain 100 is in an open state, a curtain lower end 103 is located at a top 100H of a drive range W, no current is supplied to the electric motor 2 in a stopped state, and the radially oriented permanent magnet 143a to 143d in the rotating part 140 of the braking means 14 is attracted by the magnetic field of the radially oriented permanent magnet 146a to 146d of the fixing part 141. The electric motor 2 is prevented from rotating and the lifting curtain 100 is maintained in the open state.

When the curtain lower end 103 in the open state by the lifting curtain 100 is located at the top 100H of the drive range W and a shielding operation is instructed from a drive control unit 200, a drive current is supplied from a power supply unit (not shown) to the electric motor 2. The supplying of this drive current starts rotation drive of the electric motor 2, generates a centrifugal force at the rotating part 140 that rotates with the drive shaft 21 of the electric motor 2, releases the rotating part from an attracting state of the radially oriented permanent magnet 146a to 146d of the fixing part 141, and releases a braked state by the braking means 14.

The releasing of the braked state by the braking means 14 brings the drive shaft 21 of the electric motor 2 into a free state, and the drive rotation of the electric motor 2 is inputted from the input shaft 31 via the drive shaft 21. The speed change unit 3 decelerates the inputted rotational force, and converts the force to a torque required for the lifting operation of the lifting curtain 100. By this converted rotational force, a lifting shaft 102 of the lifting curtain 100 is rotated to wind out a curtain 101 for shielding.

In the middle of this shielding operation, when the drive control unit 200 instructs that the curtain 101 is stopped at a middle portion 100M and a semi-shielded state by the curtain 101 is maintained, any more current is not supplied from the power supply unit (not shown) to the electric motor 2, the rotational speed of the electric motor 2 is attenuated, the centrifugal force generated in the braking means 14 is rapidly reduced, and braking of the braking means 14 works with an attraction force between the radially oriented permanent magnets 143a to 143d and 146a to 146d.

When the braking of the braking means 14 works, the curtain lower end 103 can maintain the stopped state at the middle portion 100M, and the lifting curtain 100 can be in the semi-shielded state.

Furthermore, when the drive control unit 200 instructs that this semi-shielded state is shifted to a totally shielded state, the current supply from the power supply unit (not shown) to the electric motor 2 is started, and drive control is performed to a bottom 100L in the same manner as in a starting operation from the top 100H of the drive range W.

In the above, description has been made as to the shielding operation of the lifting curtain 100 from the top 100H to the middle portion 100M, and from this middle portion 100M to the bottom 100L in the drive range W. An opening operation from the bottom 100L to the middle portion 100M, and from the middle portion 100M to the top 100H in the drive range W can be similarly executed for control.

By the way, a relation among a drive torque F1 of the electric motor 2, a drive torque F2 for winding up (or winding out) the lifting curtain 100 and an attraction force F3 between the rotating part 140 and the fixing part 141 in the braking means 14 can be represented by the following formula.

F1>F3>F2

The drive control mechanism of the geared motor 1 according to the present embodiment within a range where the relation among the drive torque F1, the drive torque F2 and the attraction force F3 is maintained can control any of the opening and shielding operations in the drive range W of the lifting curtain 100 only with on/off control of the supply current from the drive control unit 200 to the electric motor 2.

Ninth Embodiment

A drive control mechanism of a geared motor according to another embodiment of the present invention will be described with reference to FIG. 14. FIG. 14 is a partial cross-sectional view of the geared motor in the drive control mechanism of the geared motor according to the present embodiment.

In the present embodiment, a description that overlaps with that of the above eighth embodiment is omitted.

As shown in FIG. 14, braking means 16 includes a rotating part 160 formed of an annular body rotatably and pivotally supported by a drive shaft 21 of an electric motor 2, and including a radially oriented permanent magnet 162 divided into a plurality of portions in a circumferential direction of the annular body, each divided portion being magnetized in a radial direction with different polarities of respective adjacent portions; and a fixing part 141 formed of an annular body disposed on an outer side of the rotating part 160 offset to an electric motor 2 side to face a circumferential surface of the rotating part 160, and fixed to a case 20 of the electric motor 2, and including an annular radially oriented permanent magnet 146 divided into a plurality of portions in a circumferential direction of the annular body, each divided portion being magnetized in the radial direction with different polarities of respective adjacent portions.

The rotating part 160 includes a holding part 161 that is pivotally supported by the drive shaft 21 around an axis A and rotates with drive of the drive shaft 21, and the radially oriented permanent magnet 162 disposed in an annular shape fixed to an outer circumferential surface of the holding part 161, and formed with a longer dimension than the radially oriented permanent magnet 146.

The radially oriented permanent magnet 162 is provided so that a magnetic pole surface facing the radially oriented permanent magnet 146 of the fixing part 141 extends along the drive shaft 21 in an opposite direction to the electric motor 2.

This extended portion functions as a permanent magnet for a magnetic encoder, and detects a rotational speed or the like of the electric motor 2 with Hall element 15.

According to the above configuration, in the drive control mechanism of the geared motor 1 according to the present embodiment, the permanent magnet for the magnetic encoder is unnecessary, and the number of members of the braking means 16 can be reduced compared to the braking means 14 according to the above eighth embodiment, and the configuration is simplified to be easier to assemble.

Tenth Embodiment

A drive control mechanism of a geared motor according to another embodiment of the present invention will be described with reference to FIG. 15. FIG. 15 is a partial cross-sectional view of the geared motor in the drive control mechanism of the geared motor according to the present embodiment.

In the present embodiment, a description that overlaps with those of the above eighth and ninth embodiments is omitted.

As shown in FIG. 15, braking means 17 includes a fixing part 170 formed of an annular body fixed to a case 20 of an electric motor 2, and including a radially oriented permanent magnet 173 divided into a plurality of portions in a circumferential direction of the annular body, each divided portion being magnetized in a radial direction with different polarities of respective adjacent portions; and a rotating part 171 formed of an annular body disposed on an outer side of the fixing part 170 to face an outer circumferential surface of the fixing part 170, and rotatably and pivotally supported by a drive shaft 21 of the electric motor 2, and including a radially oriented permanent magnet 175 divided into a plurality of portions in a circumferential direction of the annular body, each divided portion being magnetized in the radial direction with different polarities of respective adjacent portions.

The fixing part 170 includes a storage part 172 fixed to the case 20 of the electric motor 2 on a one end face 20a side, and the annular radially oriented permanent magnet 173 disposed in the storage part 172 around an axis A.

The rotating part 171 includes a holding part 174 that is pivotally supported by the drive shaft 21 around the axis A and rotates with drive of the drive shaft 21; the radially oriented permanent magnet 175 fixed to a mounting portion 174a of the holding part 174 and disposed in an annular shape; and a permanent magnet 144 for a magnetic encoder that is disposed on a side opposite to the electric motor 2 via a brim portion 174b of the holding part 174 and fixed to the brim portion 174b. The mounting portion 174a is formed at an interval from the fixing part 170 so that the radially oriented permanent magnet 175 of the rotating part 171 is disposed outside and facing the radially oriented permanent magnet 173 of the fixing part 170, as seen from an axial direction of the geared motor 1.

Also, in the drive control mechanism of the geared motor 1 according to the present embodiment, in the same manner as in the drive control mechanism of the geared motor 1 according to the above eighth embodiment, it is possible to decelerate a rotation output of the electric motor 2 by the speed change unit 3 and output a driving force of the geared motor 1, execute a stopping operation between a start point and an end point in a drive range by this driving force, maintain this stopping operation, and smoothly and reliably execute respective operations that start from this stopped state without applying any external force other than a drive input of the electric motor.

In the present embodiment, since the radially oriented permanent magnet 175 of the rotating part 171 is disposed on the outermost side, the radially oriented permanent magnet 175 may be used also as a permanent magnet for a magnetic encoder by disposing Hall element 15 outside at an interval from the radially oriented permanent magnet 175, instead of providing the permanent magnet 144 for the magnetic encoder in the rotating part 171.

In the eighth to tenth embodiments, it is described that the rotating part is pivotally supported at a fixed position of the drive shaft, but the rotating part may be provided with a slide function so that the rotating part can slide along the drive shaft in a direction away from the radially oriented permanent magnet of the fixing part when the geared motor is in a starting state. In this way, since the rotating part moves away from the fixing part with the rotation of the drive shaft, an area where the radially oriented permanent magnet of the rotating part and the radially oriented permanent magnet of the fixing part face each other gradually decreases, that is, the magnetic force acting between the rotating part and the fixing part is reduced, thereby allowing the drive shaft to smoothly rotate at an earlier stage.

In the above respective embodiments, a case where the drive control mechanism of the geared motor according to the present invention is applied to the automatic lifting curtain has been described, but the mechanism can be applied also to an opening/closing device of an opening, for example, an automatic shutter, an automatic screen, and the like.

REFERENCE SIGNS LIST 1 geared motor
2 electric motor
3 speed change unit
4 to 10, 14, 16, 17 braking means
15 Hall element
20 case
20a one end face
20b protrusion
21 drive shaft
21a one end side
21b other end side
31 input shaft
32 output shaft
40, 70 rotating part
41, 71 fixing part
42, 44, 62, 64, 73, 75, 81, 91 storage part
43, 43a to 43d, 53a to 53d, 63a to 63d, 74, 203a to 203f one permanent magnet
43e front end
43f rear end
45, 45a to 45d, 55a to 55d, 65a to 65d, 76, 205a to 205f another permanent magnet
66 to 69 magnetic pole surface
91a, 91b gap
100 lifting curtain
100H top
100L bottom
100M middle portion
101 curtain
102 lifting shaft
103 curtain lower end
140, 160 rotating part
141 fixing part
142, 161 holding part
142a brim portion
142b recess
143, 143a to 143d, 146, 146a to 146d radially oriented permanent magnet
144 permanent magnet for magnetic encoder
145 storage part
145a stepped portion
170 fixing part
171 rotating part
172 storage part
173 radially oriented permanent magnet
174 holding part
174a mounting portion
174b brim portion
175 radially oriented permanent magnet A axis
W drive range
X rotating direction
Y falling direction
α shift

The invention claimed is:

1. A drive control mechanism of a geared motor, the drive control mechanism comprising:
   a geared motor including an electric motor integrally formed with a speed adjuster, the speed adjuster including an input shaft defining a drive shaft of the electric motor; and
   a braking system configured to control braking in each of driven and stopped states in an output shaft of the speed adjuster, wherein the braking system comprises:
      a rotating part rotatably and pivotally supported by the drive shaft of the electric motor, the rotating part including a first one or more permanent magnets disposed annularly, and
      a fixing part fixed to a case of the electric motor, the fixing part including a second one or more permanent magnets disposed facing the first one or more permanent magnets of the rotating part with a different polarity in the stopped state, and disposed annularly,
   wherein the rotating part of the braking system includes a storage part formed to store the first one or more permanent magnets, and having a central axis shifted parallelly with respect to a radial axis of the drive shaft of the electric motor.

2. The drive control mechanism of the geared motor according to claim 1, wherein the fixing part of the braking system includes a storage part formed to store the second one or more permanent magnets, and having a central axis of the second one or more permanent magnets shifted parallelly with respect to a central axis of the first one or more permanent magnets.

3. The drive control mechanism of the geared motor according to claim 1, wherein one end side of the drive shaft of the electric motor is the input shaft of the speed adjuster, and the rotating part of the braking system is disposed on the other end side of the drive shaft.

4. The drive control mechanism of the geared motor according to claim 1, wherein the first one or more permanent magnets of the rotating part is magnetized so that a magnetic field formed by a magnetic pole on a side of the fixing part is stronger than a magnetic field formed by a magnetic pole on a side opposite to the side of the fixing part.

5. The drive control mechanism of the geared motor according to claim 1, wherein the second one or more permanent magnets of the fixing part is magnetized so that a magnetic field formed by a magnetic pole on a side of the rotating part is stronger than a magnetic field formed by a magnetic pole on a side opposite the side of the rotating part.

6. The drive control mechanism of the geared motor according to claim 1, wherein, the first one or more permanent magnets of the rotating part functions as a permanent magnet for a magnetic encoder.

7. A drive control mechanism of a geared motor, the drive control mechanism comprising:
   a geared motor including an electric motor integrally formed with a speed adjuster, the speed adjuster including an input shaft defining a drive shaft of the electric motor; and
   a braking system configured to control braking in each of driven and stopped states in an output shaft of the speed adjuster, wherein the braking system comprises:
      a rotating part rotatably and pivotally supported by the drive shaft of the electric motor, the rotating part including a first one or more permanent magnets disposed annularly, and
      a fixing part fixed to a case of the electric motor, the fixing part including a second one or more permanent magnets disposed facing the first one or more permanent magnets of the rotating part with a different polarity in the stopped state, and disposed annularly,
   wherein the rotating part of the braking system includes a storage part formed to slidably store at least one of the second one or more permanent magnets, and having gaps from left and right surfaces of the at least one of the second one or more permanent magnets in a radial direction.

8. The drive control mechanism of the geared motor according to claim 7, wherein one end side of the drive shaft of the electric motor is the input shaft of the speed adjuster, and the rotating part of the braking system is disposed on the other end side of the drive shaft.

9. The drive control mechanism of the geared motor according to claim 7, wherein the first one or more permanent magnets of the rotating part is magnetized so that a magnetic field formed by a magnetic pole on a side of the fixing part is stronger than a magnetic field formed by a magnetic pole on a side opposite to the side of the fixing part.

10. The drive control mechanism of the geared motor according to claim 7, wherein the second one or more permanent magnets of the fixing part is magnetized so that a magnetic field formed by a magnetic pole on a side of the rotating part is stronger than a magnetic field formed by a magnetic pole on a side opposite the side of the rotating part.

11. The drive control mechanism of the geared motor according to claim 7, wherein, the first one or more permanent magnets of the rotating part functions as a permanent magnet for a magnetic encoder.

* * * * *